(12) United States Patent
Melton (10) Patent No.: US 10,232,440 B2
(45) Date of Patent: Mar. 19, 2019

(54) TRAPPED VORTEX FUEL INJECTOR AND METHOD FOR MANUFACTURE

(71) Applicant: General Electric Company, Schenectady, NY (US)

(72) Inventor: Patrick Benedict Melton, Horse Shoe, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 316 days.

(21) Appl. No.: 15/342,369

(22) Filed: Nov. 3, 2016

(65) Prior Publication Data

US 2017/0050242 A1 Feb. 23, 2017

Related U.S. Application Data

(62) Division of application No. 14/247,533, filed on Apr. 8, 2014, now Pat. No. 9,528,705.

(51) Int. Cl.
| | |
|---|---|
| *B22F 3/10* | (2006.01) |
| *B22F 3/105* | (2006.01) |
| *B33Y 10/00* | (2015.01) |
| *B33Y 80/00* | (2015.01) |
| *B22F 5/10* | (2006.01) |
| *F23R 3/12* | (2006.01) |

(Continued)

(52) U.S. Cl.
CPC ............ *B22F 3/1055* (2013.01); *B22F 5/10* (2013.01); *B22F 5/106* (2013.01); *B23K 15/0086* (2013.01); *B23K 15/0093* (2013.01); *B23K 15/02* (2013.01); *B23K 26/0006* (2013.01); *B23K 26/342* (2015.10); *B23K 26/702* (2015.10); *B33Y 10/00* (2014.12); *B33Y 50/02* (2014.12); *B33Y 80/00* (2014.12); *C22C 1/0433* (2013.01); *F02C 7/14* (2013.01); *F23R 3/12* (2013.01); *F23R 3/283* (2013.01); *F23R 3/286* (2013.01); *F23R 3/346* (2013.01); *B22F 1/0011* (2013.01); *B22F 2003/1057* (2013.01); *B22F 2304/10* (2013.01); *B22F 2998/10* (2013.01); *F05D 2220/32* (2013.01); *F05D 2230/22* (2013.01); *F05D 2300/10* (2013.01); *F23R 2900/00015* (2013.01); *F23R 2900/00018* (2013.01); *F23R 2900/03043* (2013.01); *F23R 2900/03045* (2013.01); *Y02P 10/295* (2015.11)

(58) Field of Classification Search
CPC .......... B22F 3/1055; B22F 5/106; B22F 5/10; B23K 15/0933; B23K 26/0006; B23K 26/342; B23K 26/702; B23K 15/0086; B23K 15/02; F02C 7/14; B33Y 50/02; B33Y 10/00; B33Y 80/00; C22C 1/0433; F23R 3/346; F23R 3/12; F23R 3/283; F23R 3/286

See application file for complete search history.

*Primary Examiner* — Moshe Wilensky
(74) *Attorney, Agent, or Firm* — Dority & Manning, P.A.

(57) ABSTRACT

A method for fabricating a main body of a trapped vortex fuel injector having a main body defining a fuel circuit. The method includes determining three-dimensional information of the main body including the fuel circuit where the fuel circuit is fully circumscribed within the main body and extends between an annular portion and a semi-annular portion of the main body and where the three-dimensional information of the main body further includes a plurality of fuel injection ports which provide for fluid communication between the fuel circuit and a trapped vortex pre-mix zone. The method further includes converting the three-dimensional information into a plurality of slices that define a cross-sectional layer of the main body and successively forming each layer of the main body by fusing a metallic powder using laser energy or electron beam energy.

8 Claims, 8 Drawing Sheets

(51) Int. Cl.
*F23R 3/28* (2006.01)
*F23R 3/34* (2006.01)
*C22C 1/04* (2006.01)
*B33Y 50/02* (2015.01)
*B23K 26/342* (2014.01)
*B23K 26/70* (2014.01)
*B23K 15/00* (2006.01)
*B23K 15/02* (2006.01)
*B23K 26/00* (2014.01)
*F02C 7/14* (2006.01)
*B22F 1/00* (2006.01)

TRAPPED VORTEX FUEL INJECTOR AND METHOD FOR MANUFACTURE

CROSS REFERENCE TO RELATED APPLICATIONS

The present application claims filing benefit of U.S. Divisional patent application Ser. No. 14/247,533 having a filing date of Apr. 8, 2014, which is incorporated by reference herein in its entirety.

FIELD OF THE INVENTION

The present invention generally involves a fuel injector for a combustor. More specifically, the invention relates to a trapped vortex fuel injector incorporated into a system for injecting a combustible mixture into a combustion gas flow field downstream from a primary combustion zone defined within the combustor and a method for manufacturing the trapped vortex fuel injector.

BACKGROUND OF THE INVENTION

A gas turbine generally includes a compressor section, a combustion section having a combustor and a turbine section. The compressor section progressively increases the pressure of the working fluid to supply a compressed working fluid to the combustion section. The compressed working fluid is routed through and/or around a fuel nozzle that extends axially within the combustor. A fuel is injected into the flow of the compressed working fluid to form a combustible mixture. The combustible mixture is burned within a combustion zone to generate combustion gases having a high temperature, pressure and velocity. The combustion gases flow through one or more liners or ducts that define a hot gas path into the turbine section. The combustion gases expand as they flow through the turbine section to produce work. For example, expansion of the combustion gases in the turbine section may rotate a shaft connected to a generator to produce electricity.

The temperature of the combustion gases directly influences the thermodynamic efficiency, design margins, and resulting emissions of the combustor. For example, higher combustion gas temperatures generally improve the thermodynamic efficiency of the combustor. However, higher combustion gas temperatures may increase the disassociation rate of diatomic nitrogen, thereby increasing the production of undesirable emissions such as oxides of nitrogen ($NO_x$) for a particular residence time in the combustor. Conversely, a lower combustion gas temperature associated with reduced fuel flow and/or part load operation (turndown) generally reduces the chemical reaction rates of the combustion gases, thereby increasing the production of carbon monoxide (CO) and unburned hydrocarbons (UHCs) for the same residence time in the combustor.

In order to balance overall emissions performance while optimizing thermal efficiency of the combustor, certain combustor designs include multiple fuel injectors that are arranged around the liner and positioned generally downstream from the primary combustion zone. The fuel injectors generally extend radially through the liner to provide for fluid communication into the combustion gas flow field. This type of system is commonly known in the art and/or the gas turbine industry as Late Lean Injection (LLI) and/or as axial fuel staging.

In operation, a portion of the compressed working fluid is routed through and/or around each of the fuel injectors and into the combustion gas flow field. A liquid or gaseous fuel from the fuel injectors is injected into the flow of the compressed working fluid to provide a lean or air-rich combustible mixture which spontaneously combusts as it mixes with the hot combustion gases, thereby increasing the firing temperature of the combustor without producing a corresponding increase in the residence time of the combustion gases inside the combustion zone. As a result, the overall thermodynamic efficiency of the combustor may be increased without sacrificing overall emissions performance.

One challenge with injecting a fuel into the combustion gas flow field using existing LLI or axial fuel staging systems is that the momentum of the combustion gases generally inhibits adequate radial penetration of the liquid fuel into the combustion gas flow field. As a result, local evaporation of the liquid fuel may occur along an inner wall of the liner at or near the fuel injection point, thereby potentially resulting in a high temperature zone and/or high thermal stresses. In addition, achieving and sustaining combustion in a gas turbine combustor is difficult due to various factors such as but not limited to fuel content, fuel temperature, ambient air conditions, engine load and/or operating condition of the gas turbine. These various factors may potentially create flow instabilities which may affect the NOx emissions levels generated by the combustor.

Current solutions to address these issues include extending at least a portion of the fuel injector radially inward through the liner and into the combustion gas flow field. However, this approach exposes the fuel injectors to the hot combustion gases which may potentially impact the mechanical life of the component and may lead to fuel coke buildup. Therefore, an improved system for injecting a combustible mixture into the combustion gas flow field including a trapped vortex fuel injector disposed downstream from a primary combustion zone and method for fabricating the trapped vortex fuel injector would be useful.

BRIEF DESCRIPTION OF THE INVENTION

Aspects and advantages of the invention are set forth below in the following description, or may be obvious from the description, or may be learned through practice of the invention.

One embodiment of the present invention is a trapped vortex fuel injector. The trapped vortex fuel injector includes a main body having an annular portion and a semi-annular portion that is coaxially aligned with the annular portion. The semi-annular portion extends downstream from the annular portion. An inner wall and an opposing outer wall extend between the annular and semi-annular portions. The annular portion at least partially defines a compressed or combustion air flow passage through the main body. The semi-annular portion defines a trapped vortex pre-mix zone that is downstream from the combustion air flow passage. The main body further defines a fuel circuit that is fully circumscribed within the main body and that extends between the annular portion and the semi-annular portion. A plurality of fuel injection ports provide for fluid communication between the fuel circuit and the trapped vortex pre-mix zone.

Another embodiment of the present invention is a system for injecting a combustible mixture into a combustion gas flow field downstream from a primary combustion zone of a combustor. The system includes a liner that defines a combustion gas flow path downstream from a primary fuel nozzle and/or primary combustion zone. The liner includes an inner side and an outer side and an injector opening that extends through the liner. The system further includes a trapped vortex fuel injector that is disposed downstream from the primary fuel nozzle. The trapped vortex fuel injector includes a main body that extends through the injector opening. The main body includes an annular portion that extends outwardly from the outer side of the liner, and a semi-annular portion that is coaxially aligned with the annular portion. The semi-annular portion extends downstream from the annular portion inwardly from the inner side of the liner. The main body also includes an inner wall and an opposing outer wall that extend between the annular and semi-annular portions. The annular portion defines a compressed or combustion air flow passage. The semi-annular portion defines a trapped vortex pre-mix zone that is downstream from the combustion air flow passage. The main body further defines a fuel circuit that is in fluid communication with a fuel supply. The fuel circuit is fully circumscribed within the main body and extends between the annular portion and the semi-annular portion. The main body also defines a plurality of fuel injection ports that provide for fluid communication between the fuel circuit and the trapped vortex pre-mix zone.

The present invention also includes a gas turbine. The gas turbine includes a compressor, a combustor disposed downstream from the compressor and a turbine that is disposed downstream from the combustor. The combustor includes a primary fuel nozzle, a liner that extends downstream from the primary fuel nozzle where the liner at least partially defines a combustion gas flow path within the combustor. The liner has an inner side and an outer side. The gas turbine also includes a trapped vortex fuel injector that is disposed downstream from the primary fuel nozzle. The trapped vortex fuel injector comprises a main body that extends through the liner. The main body includes an annular portion that extends outwardly from the outer side of the line and a semi-annular portion that is coaxially aligned with the annular portion. The semi-annular portion extends downstream from the annular portion inwardly from the inner side of the liner into the combustion gas flow path. The annular portion defines a compressed or combustion air flow passage within the main body. The semi-annular portion defines a trapped vortex pre-mix zone that is downstream from the combustion air flow passage. The main body further defines a fuel circuit that is in fluid communication with a fuel supply. The fuel circuit is fully circumscribed within the main body and extends between the annular portion and the semi-annular portion. The main body further defines a plurality of fuel injection ports in fluid communication with the fuel circuit. The fuel injection ports provide for fluid communication between the fuel circuit and the trapped vortex pre-mix zone.

Another embodiment of the current invention includes a method for fabricating a main body of a trapped vortex fuel injector where the main body defines a fuel circuit that is fully circumscribed within the main body and that extends between an annular portion and a semi-annular portion of the main body. The main body further defines a plurality of fuel injection ports that provide for fluid communication between the fuel circuit and a trapped vortex pre-mix zone. The method comprises the steps of determining three-dimensional information of the main body including the fuel circuit, converting the three-dimensional information into a plurality of slices that define a cross-sectional layer of the main body where at least some of the plurality of slices defines a void that is representative of the fuel circuit within the cross-sectional layer, and successively forming each layer of the main body by fusing a metallic powder using laser energy.

One embodiment of the present invention includes a trapped vortex fuel injector having a main body where the main body includes an annular portion, a semi-annular portion coaxially aligned with the annular portion and extending downstream from the annular portion and an inner wall and an opposing outer wall that extend between the annular and semi-annular portions. The annular portion defines a combustion air flow passage. The semi-annular portion defines a trapped vortex pre-mix zone that is downstream from the combustion air flow passage. The main body further defines a fuel circuit that is fully circumscribed within the main body and that extends between the annular portion and the semi-annular portion. The main body also defines a plurality of fuel injection ports that provide for fluid communication between the fuel circuit and the trapped vortex pre-mix zone. The main body is formed by an additive manufacturing process. The additive manufacturing process comprises determining three-dimensional information of the main body including the fuel circuit, converting the three-dimensional information into a plurality of slices that define a cross-sectional layer of the main body where at least some of the plurality of slices defines a void within the cross-sectional layer representing a portion of the fuel circuit, and successively forming each layer of the main body by fusing a metallic powder using laser energy.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a trapped vortex fuel injector and system for injecting a combustible mixture into a combustion gas flow field downstream within a combustor incorporated into a gas turbine for purposes of illustration, one of ordinary skill in the art will readily appreciate that embodiments of the present invention may be applied to any combustor incorporated into any turbomachine and is not limited to a gas turbine combustor unless specifically recited in the claims.

Figure 1:
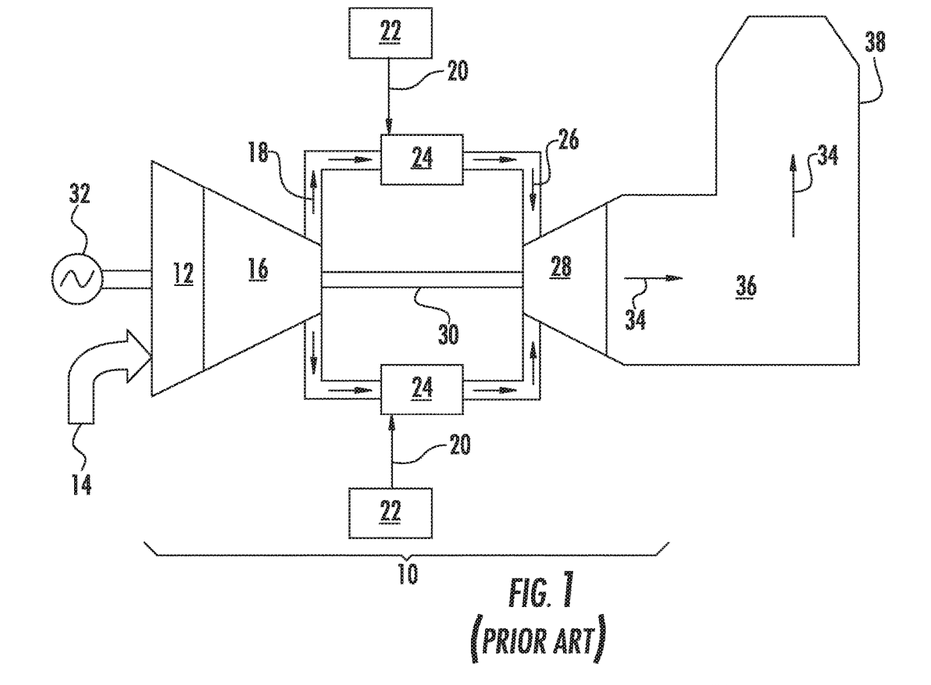
FIG. 1 is a functional block diagram of an exemplary gas turbine within the scope of the present invention.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
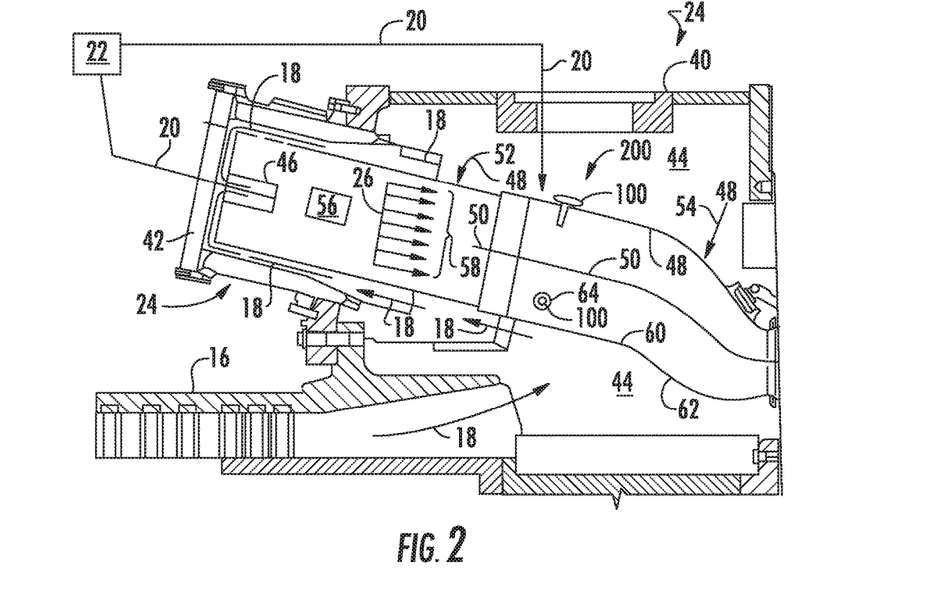
FIG. 2 is a cross-section side view of a portion of an exemplary can type combustor as may be incorporate various embodiments of the present invention.

The combustor 24 may be any type of combustor known in the art, and the present invention is not limited to any particular combustor design unless specifically recited in the claims. For example, the combustor 24 may be a can type or a can-annular type of combustor. FIG. 2 provides a cross-section side view of a portion of an exemplary gas turbine 10 including a portion of the compressor 16 and an exemplary can type combustor 24. As shown in FIG. 2, an outer casing 40 surrounds at least a portion of the combustor 24. An end cover 42 is coupled to the outer casing 40 at one end of the combustor 24. The end cover 42 and the outer casing 40 generally define a high pressure plenum 44. The high pressure plenum 44 receives the compressed working fluid 18 from the compressor 16.

At least one primary fuel nozzle 46 extends axially downstream from the end cover 42 within the outer casing 40. A liner 48 extends downstream from the primary fuel nozzle 46 within the outer casing 40. The liner 48 is generally annular and extends at least partially through the high pressure plenum 44 so as to at least partially define a combustion gas flow path 50 within the combustor 24 for routing the combustion gases 26 through the high pressure plenum 44 towards the turbine 28 (FIG. 1).

The liner 48 may be a singular liner or may be divided into separate components. For example, as illustrated in FIG. 2, the liner 48 may comprise of a combustion liner 52 that is disposed proximate to the primary fuel nozzle 46 and a transition duct 54 that extends downstream from the combustion liner 52. The liner 48 and/or the transition duct 54 may be shaped so as to accelerate the flow of the combustion gases 26 through the combustion gas flow path 50 upstream from a stage of stationary nozzles (not shown) that are disposed proximate to an inlet of the turbine 28 within the combustion gas flow path 50. A primary combustion zone 56 is defined downstream from the primary fuel nozzle 46. The primary combustion zone 56 may be at least partially defined by the liner 48. As shown, the combustion gases 26 define or form a combustion gas flow field 58 within the combustion gas flow path 50 downstream from the primary combustion zone 56 during operation of the combustor 24.

The liner 48 generally includes an inner wall 60, an opposing outer wall 62 and an injector opening 64 that extends through the inner wall 60 and the outer wall 62. The injector opening 64 provides for fluid communication through the liner 48. As shown, the liner 48 may include multiple injector openings 64 that are arranged around the liner 48 downstream from the primary fuel nozzle 46 and/or the primary combustion zone 56.

As previously stated, achieving and sustaining combustion in a gas turbine combustor is difficult due to various factors such as but not limited to fuel content, fuel temperature, ambient air conditions, engine load and/or operating condition of the gas turbine. These various factors may create flow instabilities which may affect the NOx emissions levels generated by the combustor. In order to overcome the flow instabilities, the present invention includes at least one trapped vortex fuel injector 100 that provides for fluid communication through the liner 48 and into the combustion gas flow field 58 downstream from the primary combustion zone 56. The injector 102 may provide for fluid communication through the liner 48 at any point that is downstream from the primary fuel nozzle 46 and/or the primary combustion zone 56.

Figure 3:
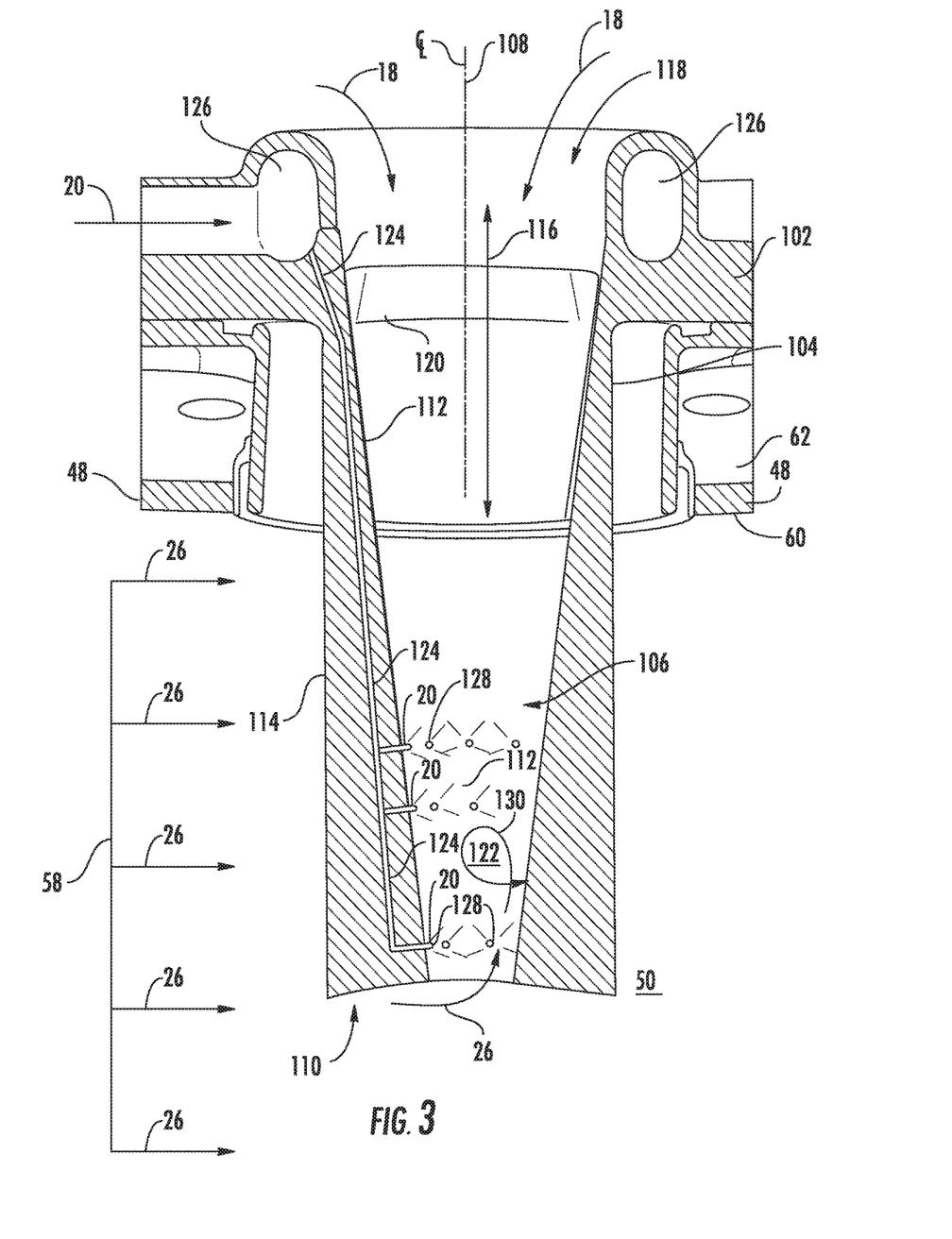
FIG. 3 is a cross sectional side view of a trapped vortex fuel injector including a portion of the combustor as shown in FIG. 2, according to one embodiment of the present invention.

FIG. 3 provides a cross sectional side view of the trapped vortex fuel injector 100 including a portion of the liner 48 as shown in FIG. 2, according to one embodiment of the present invention. As shown in FIG. 3, the trapped vortex fuel injector 100 includes a main body 102. The main body 102 may be made as a single piece during manufacturing. For example, the main body 102 made be manufacture using one or more additive manufacturing processes. Thus, the main body 102 has a monolithic construction, and is different from a component that has been made from a plurality of component pieces that have been joined together via brazing, welding or other joining process to form a single component.

In one embodiment, the main body 102 includes an annular portion 104 and a semi-annular portion 106 that extends from the annular portion 104 along a centerline 108 of the fuel injector 102. The annular portion 104, when installed in the combustor 24, is partially disposed at least partially within the injector opening 64 defined within the liner 48. The annular portion 104 extends along the centerline 108 outwardly from the outer wall of the liner 48, thus substantially positioning the annular portion 104 outside of the combustion gas flow field 58. For example, the annular portion 104 may terminate at and/or adjacent to the inner wall 60 of the liner 48.

The semi-annular portion 106 terminates at an end wall 110 defined by the main body 102. The semi-annular portion 106 is coaxially aligned with the annular portion 104 along the centerline 108. When extending through the liner 48, the semi-annular portion 106 extends from the annular portion 104 inwardly from the inner wall of the liner 48, thus positioning at least a portion the semi-annular portion 106, including the end wall 110 within the combustion gas flow path 50 (FIG. 2) and/or into the combustion gas flow field 58.

The main body 102 includes an inner wall or side 112 and an opposing outer wall or side 114. The inner and outer walls 112, 114 extend between the annular and semi-annular portions 104, 106. The inner wall 112 at least partially defines a compressed or combustion air flow passage 116 through the annular portion 104 of the main body 102. An inlet 118 is defined at an upstream end of the combustion air passage 116 and/or the main body 102. The inlet 118 provides for fluid communication into the combustion air flow passage 116. In particular embodiments, the semi-annular portion 106 is generally oriented so that the outer wall 114 faces towards or into the flow field 58 of the combustion gases 26 from the primary combustion zone 56. In one embodiment, the inlet 118 is in fluid communication with the high pressure plenum 44 (FIG. 2) and/or another compressed air source for providing the compressed working fluid 18 to the combustion air flow passage 116. In one embodiment, as shown in FIG. 3, a plurality of swirler vanes 120 extend within the combustion air flow passage 116. The swirler vanes 120 may be configured or angled to provide angular swirl to the compressed working fluid 18 about the centerline 108 as it flows through the combustion air flow passage 116.

In various embodiments, as shown in FIG. 3, the semi-annular portion 106 at least partially defines a trapped vortex pre-mix zone 122 downstream from the combustion air flow passage 118. In operation, the semi-annular portion 106 defines a bluff body or obstruction within the combustion gas flow field 58. As the combustion gases 26 flow past the semi-annular portion 106, a low pressure, recirculation or vertical flow zone is created downstream from the inner wall 112 of the semi-annular portion 106, thereby causing the combustion gases to spin or swirl in a vertical flow motion. As a result, the semi-annular portion 106 provides or defines the trapped vortex pre-mix zone 122 adjacent to or near the inner wall 112. The trapped vortex pre-mix zone 122 extends along at least a portion of the inner wall 112 of the semi-annular portion 106 of the main body 102.

In one embodiment, as shown in FIG. 3, the main body 102 defines at least one fuel circuit 124. The fuel circuit 124 is fully circumscribed within the main body 102 between the inner wall 112 and the outer wall 114. In various embodiments, the fuel circuit 122 is formed via one or more additive manufacturing methods, techniques or processes, thus providing for greater accuracy and/or more intricate details within the fuel circuit 124 than previously producible by conventional manufacturing processes. As shown in FIG. 3, the fuel circuit 124 extends between the annular portion 104 and the semi-annular portion 106.

The fuel circuit 124 is in fluid communication with a fuel source such as the fuel supply 22 (FIG. 2). As shown in FIG. 3, the fuel source may provide a liquid and/or a gas fuel 20 to the fuel circuit 124. In one embodiment, the fuel circuit 124 is in fluid communication with a fuel plenum 126 that is at least partially defined by the main body 102. In one embodiment, the fuel plenum 126 may be defined proximate to the inlet 118 of the combustion air flow passage 116. The fuel plenum 126 may be fluidly connected to the fuel source such as the fuel supply 22.

In various embodiments, the main body 102 defines at least one fuel injection port 128 that is in fluid communication with the fuel circuit 124. The fuel injection port 128 is disposed downstream from the fuel source and/or the fuel plenum 126.

Figure 4:
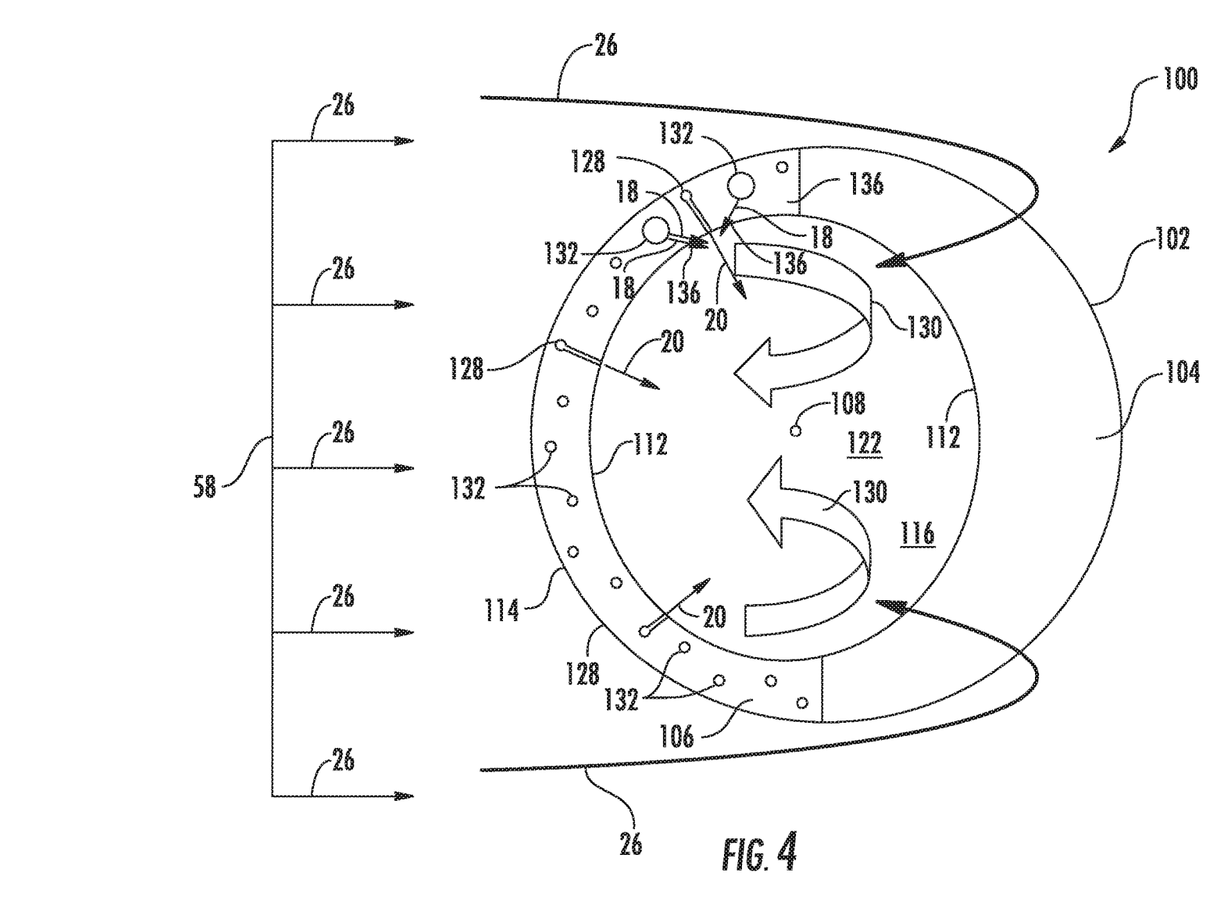
FIG. 4 is a cross sectional bottom view of the trapped vortex fuel injector as shown in FIG. 3, according to various embodiments of the present invention.

FIG. 4 provides a cross sectional bottom view of the trapped vortex fuel injector 100 according to various embodiments of the present invention. In particular embodiments, as show in FIGS. 3 and 4, the main body 102 at least partially defines a plurality of fuel injection ports 128. The fuel injection ports 128 are defined within the semi-annular portion 106 of the main body 102. In one embodiment, as shown in FIG. 3, the fuel injection ports 128 are defined along the inner wall 112, thus providing for fluid communication from the fuel circuit 124 through the inner wall 112 and into the trapped vortex pre-mix zone 122.

As shown in FIG. 4, the fuel injection ports 128 may be circumferentially spaced within the semi-annular portion 106 to provide for fluid communication through the inner wall 112 and into the trapped vortex pre-mix zone 122. In one embodiment, at least a portion of the fuel injection ports 128 are oriented to induce swirl to a flow of the fuel 20 as it flows from the fuel circuit 124 into the trapped vortex pre-mix zone 122. For example, at least some of the fuel injection ports 128 may be angled with respect to the centerline 108.

In operation, a portion of the compressed working fluid 18 flows through the inlet 118 and into the combustion air flow passage 116 into the trapped vortex recirculation zone 122. Fuel 20 is injected through the fuel injection ports 128 into the trapped vortex recirculation zone 122 thus forming a pre-mixed combustible mixture 130 therein. The vertical flow of the combustion gases 26 enhance mixing and/or combustion of the combustible mixture, thus increasing overall flame stability within the combustor and reducing or enhancing NOx emissions levels.

The temperature differential between the fuel supplied to the fuel circuit 124 and the combustion gases results in a cooling effect to the main body 102 of the trapped vortex fuel injector 100, thus allowing a deeper penetration of the semi-annular portion 106 of the main body 102 than conventional late lean or axially staged fuel injectors, thus further enhancing the benefits of axial staged fuel injection. However, in particular combustors, the cooling effect provided by the fuel only is insufficient to meet life requirements. As a result, the trapped vortex fuel injector 100 may further include at least one cooling channel 132.

Figure 5:
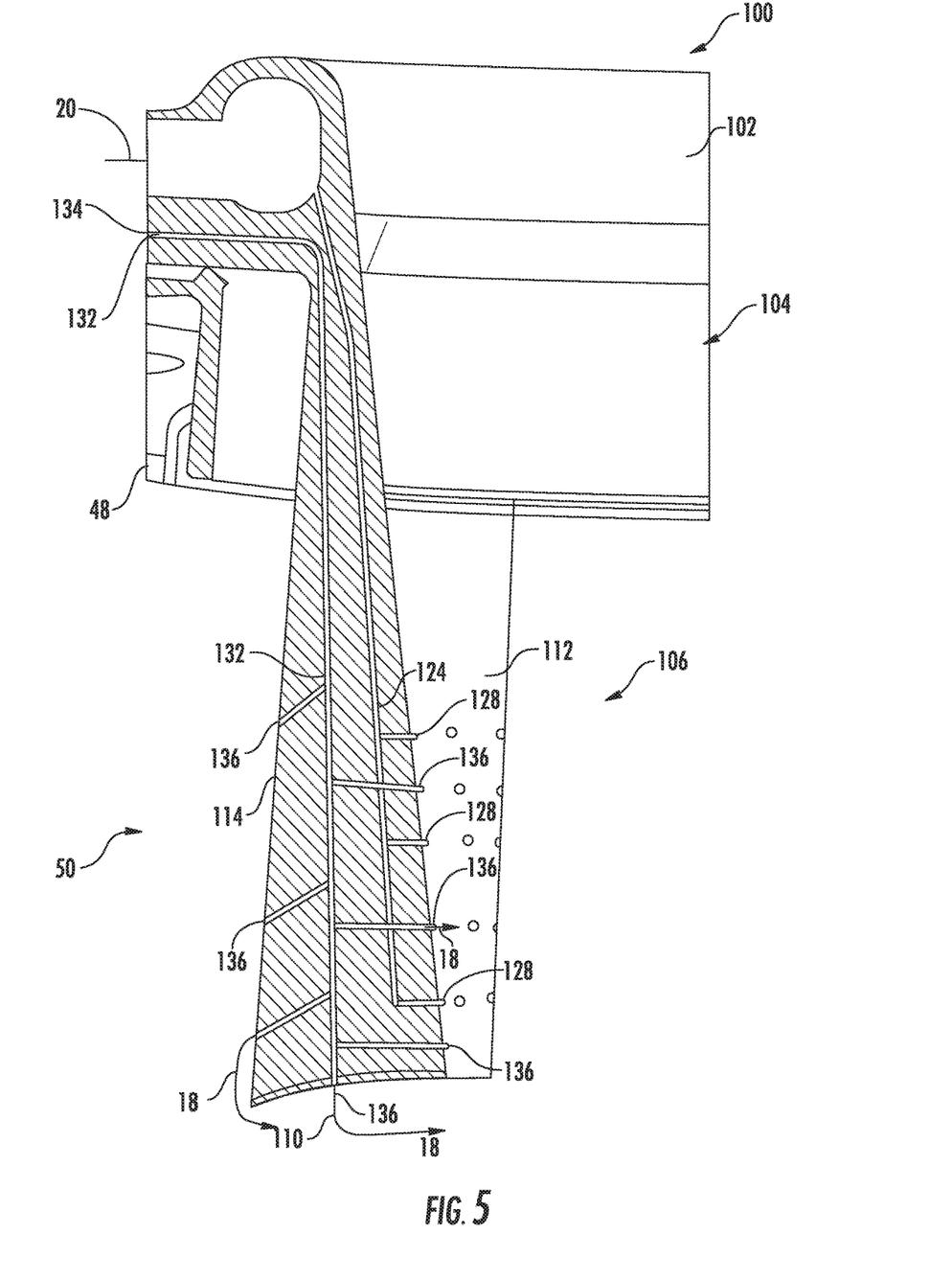
FIG. 5 is a cross sectional side view of the trapped vortex fuel injector as shown in FIG. 3, according to one embodiment of the present invention.

FIG. 5 is a cross sectional side view of the trapped vortex fuel injector 100 including a portion of the liner 48 as shown in FIG. 3, according to one embodiment of the present invention. In one embodiment, as shown in FIG. 5, the main body 102 also defines at least one cooling channel 132. The cooling channel 132 is fully circumscribed within the main body 102 between the inner wall 112 and the outer wall 114. In various embodiments, the cooling channel 132 is formed via one or more additive manufacturing methods, techniques or processes, thus providing for greater accuracy and/or more intricate details within the cooling channel 132 than previously producible by conventional manufacturing processes.

As shown in FIG. 3, the cooling channel 132 extends between the annular portion 104 and the semi-annular portion 106. In particular embodiments, a cooling air inlet 134 is defined within the annular portion 104 of the main body 102. The cooling air inlet 134 is in fluid communication with the cooling channel 132. In particular embodiments, the cooling air inlet 134 provides for fluid communication between a compressed air supply such as the high pressure plenum 44 (FIG. 2) and the cooling channel 132. In various embodiments, the cooling air inlet 134 is positioned outside of the liner 48 and/or outside of the combustion gas flow path 50 or the combustion gas flow field 58.

In particular embodiments, the main body 102 defines at least one cooling air outlet 136 that is in fluid communication with the cooling channel 132 downstream from the cooling air inlet 134. In particular embodiments, the main body 102 defines a plurality of the cooling air outlets 136. In various embodiments, at least a portion of the cooling air outlets 136 are defined within the semi-annular portion 106 of the main body 102. In one embodiment, as shown in FIGS. 4 and 5, the cooling air outlet 136 is disposed or defined on the end wall 110, thus providing for fluid communication from the cooling channel through the end wall 110. In one embodiment, at least one of the cooling air outlets 136 is disposed or defined on the outer wall 114 along the semi-annular portion 106, thus providing for fluid communication from the cooling channel through the outer wall 114, thereby providing at least one of convection or film cooling to the outer wall 114.

In particular embodiments, as shown in FIGS. 4 and 5, a plurality of cooling air outlets 136 is disposed or defined on the inner wall 112 along the semi-annular portion 106, thus providing for fluid communication from the cooling channel through the inner wall 112 into the trapped vortex pre-mix zone 122. In particular embodiments, the main body 102 defines a plurality of the cooling air outlets 136 where at least a portion of the cooling air outlets provide for fluid communication through the inner wall 112 and at least one of the outer wall 114 and the end wall 110.

In one embodiment, as shown in FIG. 4, one or more of the cooling air outlets 136 are oriented to direct a jet of the compressed working fluid 18 into a jet of the fuel 20 flowing from at least one of the fuel injection ports 128, thus enhancing the pre-mixing of the fuel and compressed working fluid 18 within the trapped vortex pre-mix zone 122 prior to injection into the combustion gas flow field 58. In particular embodiments, at least one of the cooling air outlets 136 are oriented to induce swirl to the jet or flow of the compressed working fluid 18 flowing from the corresponding cooling channel 136 into the trapped vortex pre-mix zone, thus enhancing the pre-mixing of the fuel and compressed working fluid 18 within the trapped vortex pre-mix zone 122 prior to injection into the combustion gas flow field 58.

In one embodiment, at least one cooling channel 136 may extend from the annular portion 104 of the main body 102 into the semi-annular portion 106 and back into the annular portion 104. The cooling air outlet 136 is defined along the annular portion 104. As a result, the compressed working fluid 18 may be routed through the main body 102 for cooling and then routed back into the high pressure plenum 44 and/or routed towards a head end of the combustor 24 were it may be used for pre-mixing with fuel 20 from the axially extending fuel nozzle 46 and/or for cooling of other combustor components.

Figure 6:
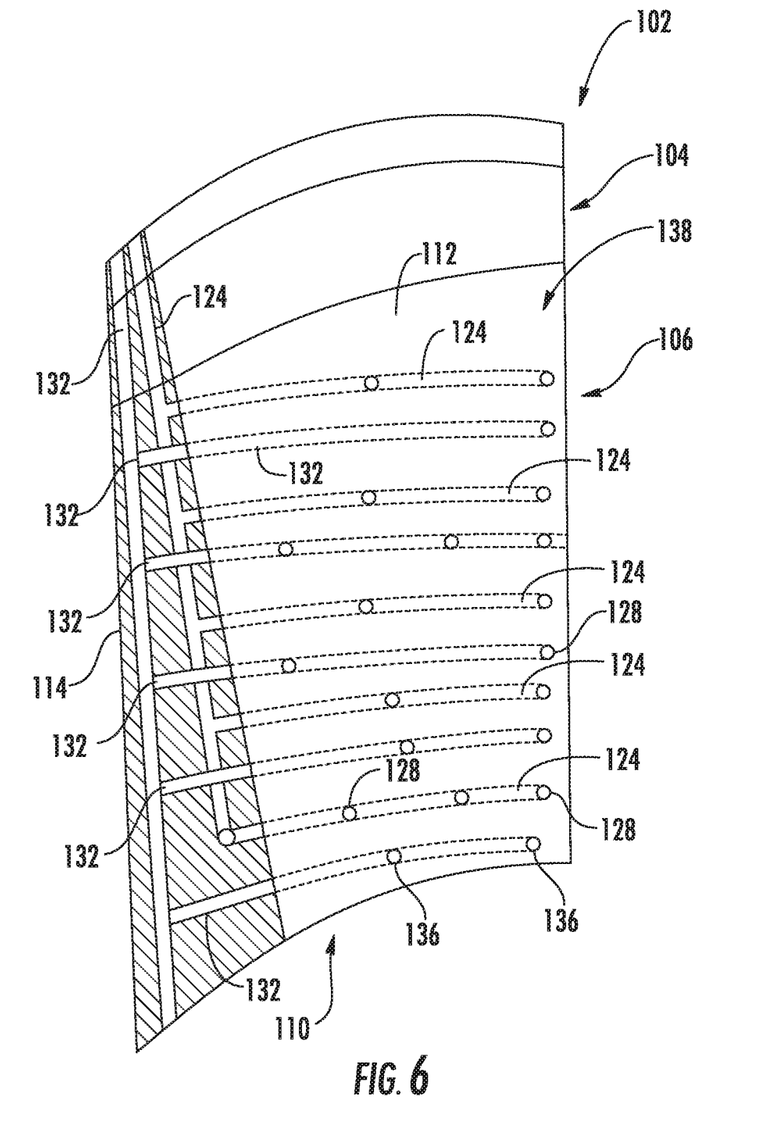
FIG. 6 is a partial cross sectional perspective view of a portion of the trapped vortex fuel injector as shown in FIG. 3, according to various embodiments of the present invention.
Figure 7:
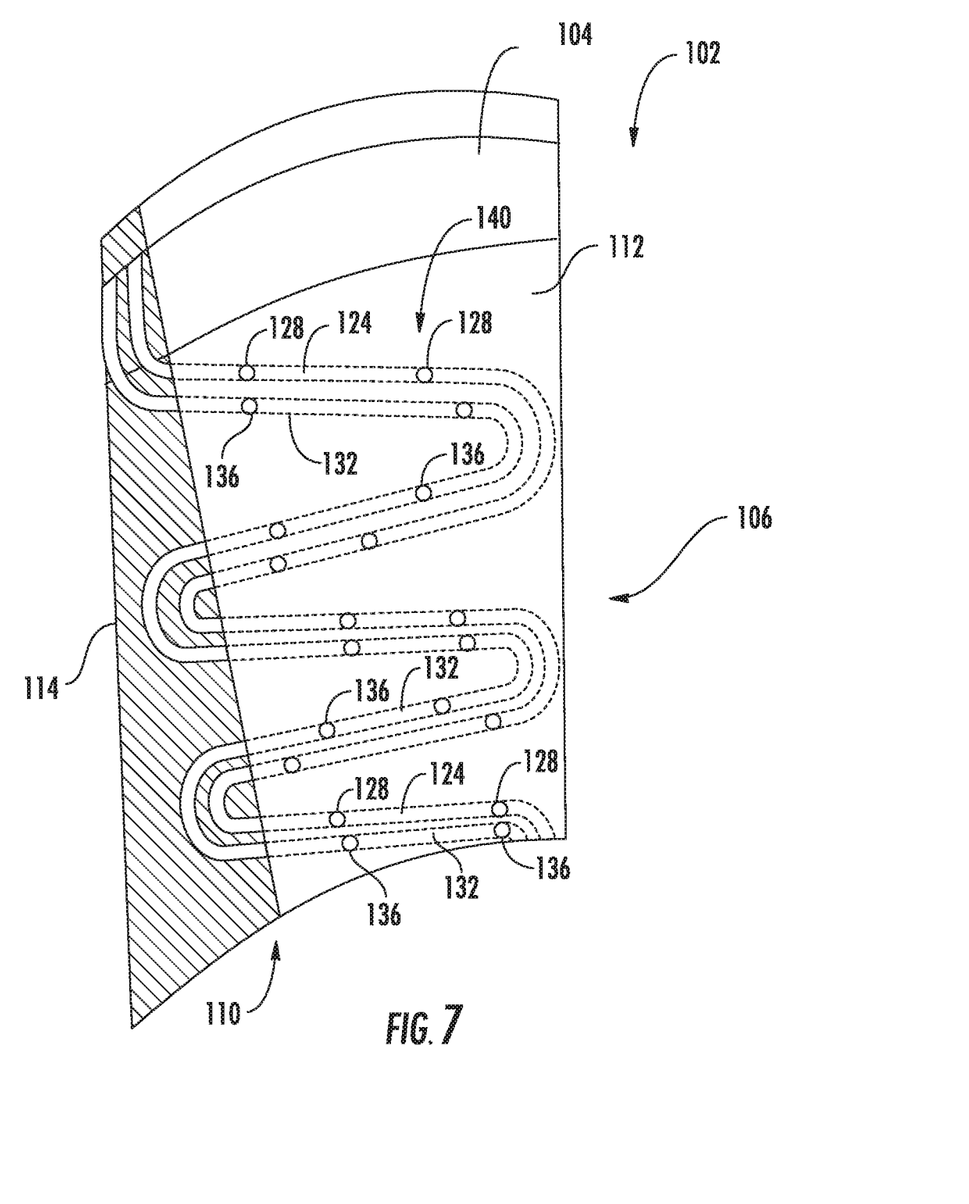
FIG. 7 is a partial cross sectional perspective view of a portion of the trapped vortex fuel injector as shown in FIG. 3, according to various embodiments of the present invention.

FIGS. 6 and 7 provide partial cross sectional perspective views of a portion of the main body 102 according to various embodiments of the present invention. In one embodiment, as shown in FIG. 6, at least one of the fuel circuit 124 and/or the cooling channel 132 extend in a helical pattern 138 within the semi-annular portion 106. In this embodiment, the cooling air outlet 136 or outlets 136 and/or the fuel injector ports 128 may be disposed along the inner wall 112. In one embodiment, as shown in FIG. 7, at least one of the fuel circuit 124 and/or the cooling channel 132 extend in a generally serpentine or winding pattern 140 within the semi-annular portion 106. In this embodiment, the cooling air outlet 136 or outlets 136 and/or the fuel injector ports 128 may be disposed along the inner wall 112.

Figure 8:
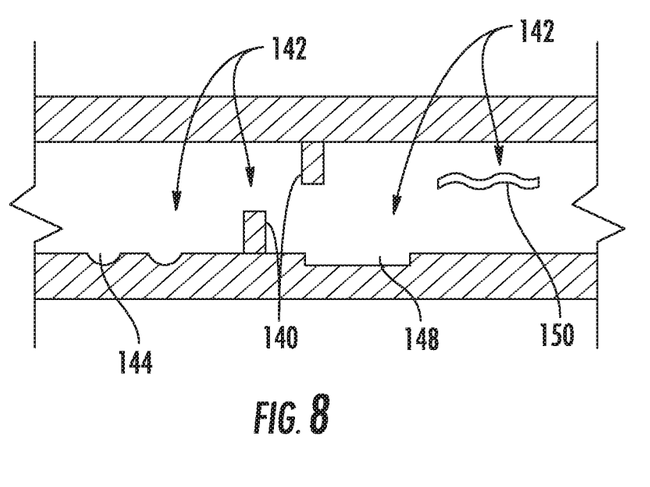
FIG. 8 is a cross sectional view representative of either an exemplary fuel circuit or an exemplary cooling channel of the trapped vortex fuel injector as shown in FIGS. 3 and 5, according to one or more embodiments of the present invention.

FIG. 8 is a cross sectional view representative of either an exemplary fuel circuit 124 or an exemplary cooling channel 132, according to one or more embodiments of the present invention. In particular embodiments, as shown in FIG. 8, one or more flow features 142 may be defined within the fuel circuit 124 and/or the cooling channel 132. The flow feature or features 142 may include concave of convex dimples 144, ribs 146, slots 148, grooves 150 or other features for enhancing cooling effectiveness of the fuel 20 and/or the compressed working fluid 18. In various embodiments, the flow feature 136 or features are formed via one or more additive manufacturing methods, techniques or processes previously discussed, thus providing for greater accuracy and/or more intricate details within the cooling channel 132 than previously producible by conventional manufacturing processes.

In operation, a portion of the compressed working fluid 18 is routed into the cooling channel 132 via the cooling air inlet 134. The compressed working fluid 18 flows through the cooling channel 132, thus removing thermal energy from the semi-annular portion 106 by providing at least one of convection, impingement and/or conduction cooling to the inner, outer and/or the end walls 112, 114 and 110 respectively, of the semi-annular portion 106. In particular embodiments, the compressed working fluid 18 flows across the flow features 142 to enhance the cooling effectiveness of the compressed working fluid 18, thereby further enhancing the mechanical life of the fuel injector 102. In addition or in the alternative, the fuel 20 may flow across the flow features 142 to enhance the cooling effectiveness of the fuel 20 and to raise the temperature of the fuel 20, thereby further enhancing the mechanical life of the fuel injector 102 and/or increasing flame stability within the combustion gas path 50.

Conventional LLI fuel injectors are generally expensive to fabricate and/or repair because the conventional LLI fuel injector designs include complex assemblies and joining of a large number of components. More specifically, the use of braze joints can increase the time needed to fabricate such components and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. The presence of numerous braze joints can undesirably increase the weight and manufacturing cost of the component.

In order to reduce costs, weight and to provide the fuel circuit 124, the cooling channel 132 and/or the flow feature 142 as described, the main body 102 can be made using an additive manufacturing process. In one embodiment, the additive manufacturing process of Direct Metal Laser Sintering DMLS is a preferred method of manufacturing the main body 102 described herein.

Figure 9:
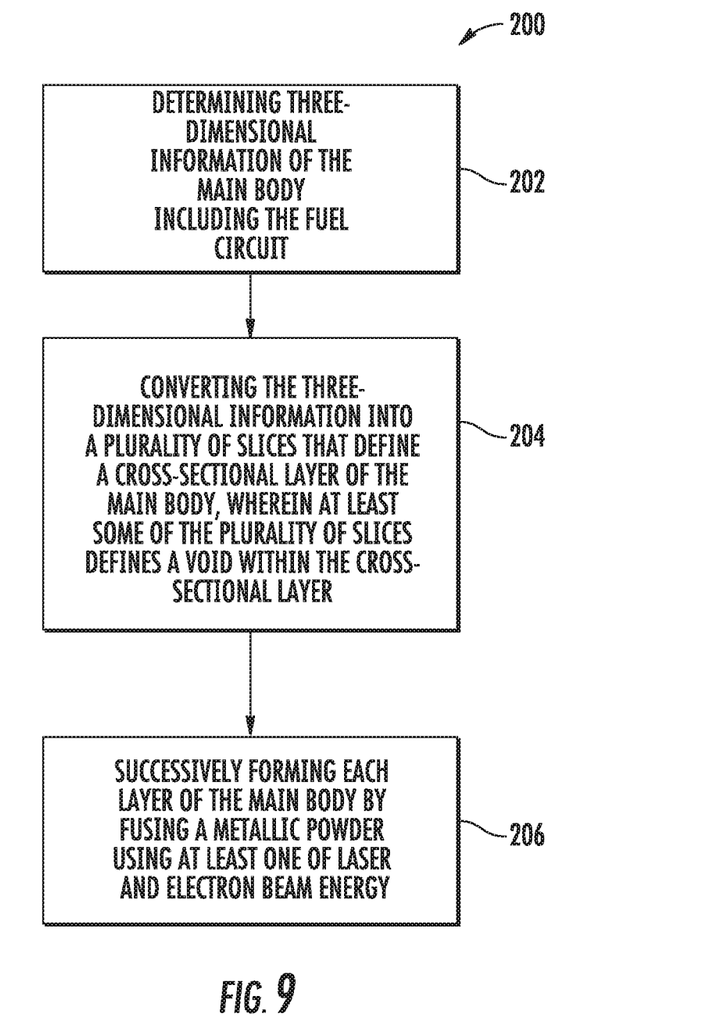
FIG. 9 is a flow chart illustrating an exemplary embodiment of a method for fabricating a main body portion of a fuel injector as shown in various embodiments in FIGS. 2-8.

FIG. 9 is a flow chart illustrating an exemplary embodiment of a method 200 for fabricating the main body 102 as described herein and as shown in FIGS. 2-8. Method 200 includes fabricating at least the main body 102 of the trapped vortex fuel injector 100 using the Direct Metal Laser Sintering (DMLS) process.

DMLS is a known manufacturing process that fabricates metal components using three-dimensional information, for example a three-dimensional computer model of the component. The three-dimensional information is converted into a plurality of slices where each slice defines a cross section of the component for a predetermined height of the slice. The component is then "built-up" slice by slice, or layer by layer, until finished. Each layer of the component is formed by fusing a metallic powder using a laser.

Accordingly, method 200 includes the step 202 of determining three-dimensional information of the main body 102 and the step 204 of converting the three-dimensional information into a plurality of slices where each slice defines a cross-sectional layer of the main body 102. Each slice may further define a void that is representative of a portion of at least one of the fuel circuit 124, the cooling channel 132 and/or the flow feature 142. The main body 102 is then fabricated using DMLS, or more specifically each layer is successively formed 206 by fusing a metallic powder using laser energy. Each layer has a size between about 0.0005 inches and about 0.001 inches. As a result, the fuel circuit 124 may be defined fully circumscribed within the main body 102. In addition or in the alternative, the cooling channel 132 and/or the flow feature 142 may also be formed in this manner. Additive manufacturing allows for the fuel circuit 124, the cooling channel 132, and/or the flow features 142 to be formed in intricate previously non-producible and/or cost prohibitive patterns and/or shapes.

The main body 102 may be fabricated using any suitable laser sintering machine. Examples of suitable laser sintering machines include, but are not limited to, an EOSINT® M 270 DMLS machine, a PHENIX PM250 machine, and/or an EOSINT® M 250 Xtended DMLS machine, available from EOS of North America, Inc. of Novi, Mich. The metallic powder used to fabricate the main body 104 is preferably a powder including cobalt chromium, but may be any other suitable metallic powder, such as, but not limited to, HS 1888 and INCO625. The metallic powder can have a particle size of between about 10 microns and 74 microns, preferably between about 15 microns and about 30 microns.

Although the methods of manufacturing the main body 102 including the fuel circuit 124, cooling channel 132 and/or cooling channels 132 and/or the flow features 142 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

The various embodiments described herein and illustrated in FIGS. 2-9, provide various technical advantages over existing production systems for injecting fuel into a combustion gas flow field. For example, conventional fuel injectors or "late lean" fuel injectors, depend on the proper fuel/air momentum leaving the fuel injector to penetrate into the cross flow or combustion gas flow field for optimal emissions and hardware durability. The fuel circuits enable the semi annular portion of the main body to protrude into the combustion gas flow field and to act as a trapped vortex feature. For example, fuel flowing through the fuel circuits provides cooling to the semi-annular portion of the main body, thus extending the life of the fuel injector while providing the added benefit of more complete mixing within the trapped vortex pre-mix zone. Further cooling may be realized by providing the cooling channels, thus further enhancing the life of the trapped vortex fuel injector and allowing for deep penetration of the fuel-air mixture into the combustion gas flow field. As a result, the fuel injectors presented herein are not as sensitive to the engine load as current production axial staged or late lean fuel injectors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for fabricating a main body of a trapped vortex fuel injector, the main body defining a fuel circuit:
  determining three-dimensional information of the main body including the fuel circuit, wherein the fuel circuit is fully circumscribed within the main body and extends between an annular portion and a semi-annular portion of the main body, wherein the three-dimensional information of the main body further includes a plurality of fuel injection ports, wherein the fuel injection ports provide for fluid communication between the fuel circuit and a trapped vortex pre-mix zone;

converting the three-dimensional information into a plurality of slices that define a cross-sectional layer of the main body, wherein at least some of the plurality of slices defines a void within the cross-sectional layer; and successively forming each layer of the main body by fusing a metallic powder using laser energy or electron beam energy.

2. The method as in claim 1, wherein determining three-dimensional information of the main body further comprises generating a three dimensional model of the main body.

3. The method as in claim 1, wherein determining three-dimensional information of the main body further comprises generating a three dimensional model of the main body including a fuel injection port that is in fluid communication with the fuel circuit.

4. The method as in claim 1, wherein determining three-dimensional information of the main body further comprises generating a three dimensional model of the main body including a cooling channel, cooling air inlet that is in fluid communication with the cooling channel and a cooling air outlet that is in fluid communication with the cooling channel downstream from the cooling air inlet.

5. The method as in claim 1, wherein determining three-dimensional information of the main body further comprises generating a three dimensional model of the main body including at least one flow feature that is defined within the main body along one of the fuel circuit or the cooling channel.

6. The method as in claim 1, wherein successively forming each layer of the main body by fusing a metallic powder using laser energy further comprises fusing a metallic powder comprising at least one of cobalt chromium, HS188 and INCO 625.

7. The method as in claim 1, wherein successively forming each layer of the main body by fusing a metallic powder using laser energy further comprises fusing a metallic powder that has a particle size between about 10 microns and about 75 microns.

8. The method as in claim 7, wherein successively forming each layer of the main body by fusing a metallic powder using laser energy further comprises fusing a metallic powder that has a particle size between about 15 microns and about 30 microns.

* * * * *